United States Patent [19]

Kaaden et al.

[11] Patent Number: 5,113,397
[45] Date of Patent: May 12, 1992

[54] APPARATUS RELATING TO THE REPRODUCTION OF ERROR ENCODED DIGITALLY RECORDED SIGNALS

[75] Inventors: Jürgen Kaaden, VS-Pfaffenweiler; Dietmar Uhde, Königsfeld; Franz Bigge, VS-Villingen, all of Fed. Rep. of Germany

[73] Assignee: Deutsche Thomson-Brandt GmbH, Villingen-Schwenningen, Fed. Rep. of Germany

[21] Appl. No.: 473,671

[22] Filed: Feb. 2, 1990

[30] Foreign Application Priority Data

Feb. 3, 1989 [DE] Fed. Rep. of Germany ....... 3903163
Feb. 3, 1989 [DE] Fed. Rep. of Germany ....... 3903165

[51] Int. Cl.$^5$ ............................................. G11B 5/035
[52] U.S. Cl. ..................................... 371/5.1; 375/11; 360/53; 360/65
[58] Field of Search ................... 371/5.1, 5.5; 360/53; 375/11; 360/65

[56] References Cited

U.S. PATENT DOCUMENTS

| | | |
|---|---|---|
| 4,355,402 | 10/1982 | Kromer, III et al. . |
| 4,414,668 | 11/1983 | Iwasaki . |
| 4,509,155 | 4/1985 | Masuda et al. . |
| 4,637,036 | 1/1987 | Kobari . |
| 4,725,901 | 2/1988 | Eiberger et al. . |
| 4,729,045 | 3/1988 | Baugh ................................. 360/53 |
| 4,730,313 | 3/1988 | Stephenson et al. ................ 371/5.5 |
| 4,789,908 | 12/1988 | Eiberger . |
| 4,811,120 | 3/1989 | Kashida et al. ...................... 371/5.1 |
| 4,933,939 | 6/1990 | Kendall et al. ...................... 371/5.5 |
| 4,984,101 | 1/1991 | Kanota et al. ........................ 360/65 |

Primary Examiner—Joseph Ruggiero
Assistant Examiner—Allen M. Lo
Attorney, Agent, or Firm—Joseph S. Tripoli; Joseph J. Laks

[57] ABSTRACT

A digital signal, such as obtained during playback from a DAT machine, includes a first component containing e.g. the audio content and a second component containing error recognition code. A signal processor derives in accordance with the second component an error signal representative of errors in the digital signal. A microcomputer then calculates an error rate signal. The error rate signal may be visually displayed or the error rate signal may be applied to the pre-amplifier circuits in the playback transducer stage to minimize the errors.

18 Claims, 2 Drawing Sheets

APPARATUS RELATING TO THE REPRODUCTION OF ERROR ENCODED DIGITALLY RECORDED SIGNALS

BACKGROUND OF THE INVENTION

1. Field of the Invention

This invention relates to the reproduction of error encoded, digitally recorded signals.

2. Description of Related Art

Recorder/reproducer devices are known for digitally recording and reproducing digital signals, such as digital video signals or such as digital audio signals of e.g. the DAT type. In such systems, measures for error protection in the form of error codes are introduced into the data transmission in order to determine and correct multiple and random errors during playback. Multiple errors are created, for example, by dropouts in the tape, dust, dirt, scratches or dirty magnetic heads. Random errors may be created by crosstalk from adjacent tracks, incompletely deleted data from prior recording, or by instabilities in the transport mechanism. Such kind of errors are recognized in a conventional manner and corrected by playback processing circuitry so that the errors do not introduce audible noise.

Normally, the user of the recording device is unaware of the severity of the defects. Thus, it is difficult to judge the quality of the recorded material or of the reproducing heads or notice faults in the drive system. As a result, the user may not generate a backup copy of the recording or perform needed repairs.

SUMMARY OF THE INVENTION

It is therefore desirable in accordance with one aspect of the invention, to provide a reproducing device that is capable of assessing the quality of the reproduced material with respect to errors. Advantageously, according to the invention, a processing circuit is provided during playback which determines the error rate in the transduced signal and visually displays an indication of such error rate. In this way, it is possible to determine whether the error rate is increasing, how fast the rate is increasing, or whether the error rate is approaching an unacceptable value. The source of the error may then be investigated in a timely manner and eliminated.

The visual display may be operative all the time, or a button or key may be provided for the user to activate the display in order to check the error rate. Instead of operating a button or key, the user may enter a code word which is processed by a microcomputer to activate the visual display of the error rate. In some instances, it may suffice to activate the display automatically should the error rate exceed a threshold value. This option may be provided in addition to the other previously mentioned modes of activating the visual display.

In accordance with a further inventive aspect, the transducer amplifier stage is provided with adjustable playback equalization and the equalization is controlled in such a way that the error rate is kept to a minimum.

Previously, equalization was performed on a one-time basis, on the occasion of the manufacturing of the tape recorder unit. A measuring cassette tape and an external error rate measuring device were employed. When the headwheel or magnetic heads in the headwheel were changed, another and more difficult adjustment procedure had to be performed. Difficulties in adjustment arose due to such factors as poor access to the head pre-amplifiers.

Other disadvantages exist to one-time adjustment. For example, adjustment for one cassette or for one type of recording material may not be the correct adjustment for a different cassette or a different type of recorded material. Also, a one-time adjustment is subject to degradation due to aging.

As an advantage of the invention, when equalization is controlled by the error rate, adjustment to optimum equalization may be performed continually, independently of the recording material used. Furthermore, the problem of adjustment changes with aging is minimized. Advantageously, the adjustment of the equalization may be performed continually as soon as the playback mode is engaged. Optimum equalization at minimum error rate is established automatically, with error correction data being evaluated on a continual basis.

Alternatively, a readjustment of the equalization may be performed statically or aperiodically on the occasion of changes in the system. For example, a readjustment may be performed on changeover of cassettes, with changes in the configuration of the recording system, or upon replacement of the magnetic head or head drum.

If more than one channel is available, such as in a two channel R-DAT device, it may be desirable to perform the correction of the equalization by adjusting each channel individually, and at the same time, adjusting the channels for best symmetry with a minimum error rate. In carrying out an aspect of the invention, the adjustment of equalization may be performed by introducing different impedances in the negative feedback circuitry of the head pre-amplifiers. Alternatively, the adjustment of the equalization may be performed by adjusting the resistances in one or more active or passive filters.

DETAILED DESCRIPTION OF THE PREFERRED EMBODIMENTS

Figure 1:
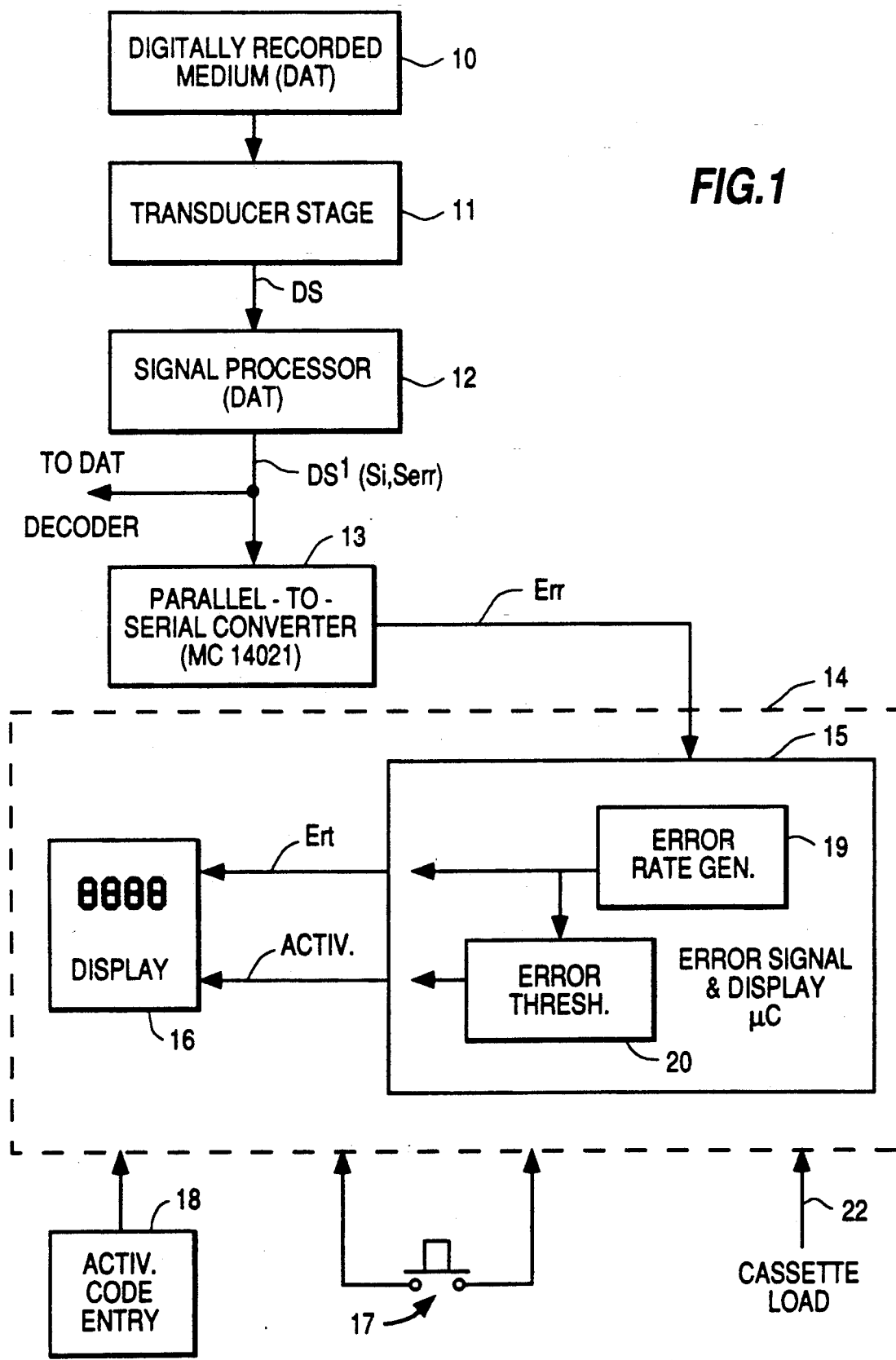
FIG. 1 illustrates a block circuit diagram of a reproducing system for a digitally recorded signal, with error rate calculation and display in accordance with an aspect of the invention.

FIG. 1 illustrates in block circuit diagram, a playback system of a digitally recorded signal with error rate computation and display. In FIG. 1, a record medium 10, such as a magnetic tape, has recorded therein a digital audio signal in the DAT format. A transducer stage 11 transduces the recorded information from the tape and obtains at the transducer output a digital DAT signal DS for further processing. DAT signal DS is applied to a DAT signal processor 12, which generates in parallel bit form an encoded digital signal DS' in the DAT format.

Signal DS' has several components including a component Si that relates to the audio information content of the signal and a second component Serr that contains error recognition code information. Signal DS' is forwarded to conventional DAT decoder circuits for reconstructing the audio signal.

Error signal Serr is used to recognize errors and defects in the original audio signal using conventional DAT error decoding techniques. Error signal Serr, is in parallel bit form and is updated at intervals of several microseconds. Error signal Serr is coupled to a parallel-to-serial converter 13 for generating a serial bit error signal Err. Signal Err is coupled to a microcomputer 15 of an error code and display processor 14. Microcomputer 15 reads in the error data whenever there is time available for this task.

In microcomputer 15, the errors are weighted and otherwise processed in an error rate generator block 19. Generator 19 produces a signal Ert, properly formatted for use by a display 16, that will visually display the error rate to the DAT user. Display 16 may take the form of a segmented LCD or LED display, may take the form of a recording level indicator, or may utilize the display facility present in the playback portion of the DAT recorder.

Visual display of the error rate may be manually activated or initiated in several other ways. A mechanical switch, such as a button or key, represented by a contact switch 17 in FIG. 1, may complete a signal path into error code and display processor 14 for initiating the visual display of the error rate information. Alternatively, the visual display may be activated by the user entering an activation code by means of a code entry device 18, such as a keyboard. As a third alternative, the visual display may be activated during cassette changeover or loading by a signal conventionally generated on a signal line 22.

As still another option, the visual display of the error rate may be activated automatically by microcomputer 15 when the error rate exceeds a predetermined threshold. The error rate information developed by error rate generator 19 is also supplied to an error rate threshold computation block 20. Computation block 20 generates an activation signal that is coupled to display 16 when the error rate exceeds a predetermined threshold value.

Figure 2:
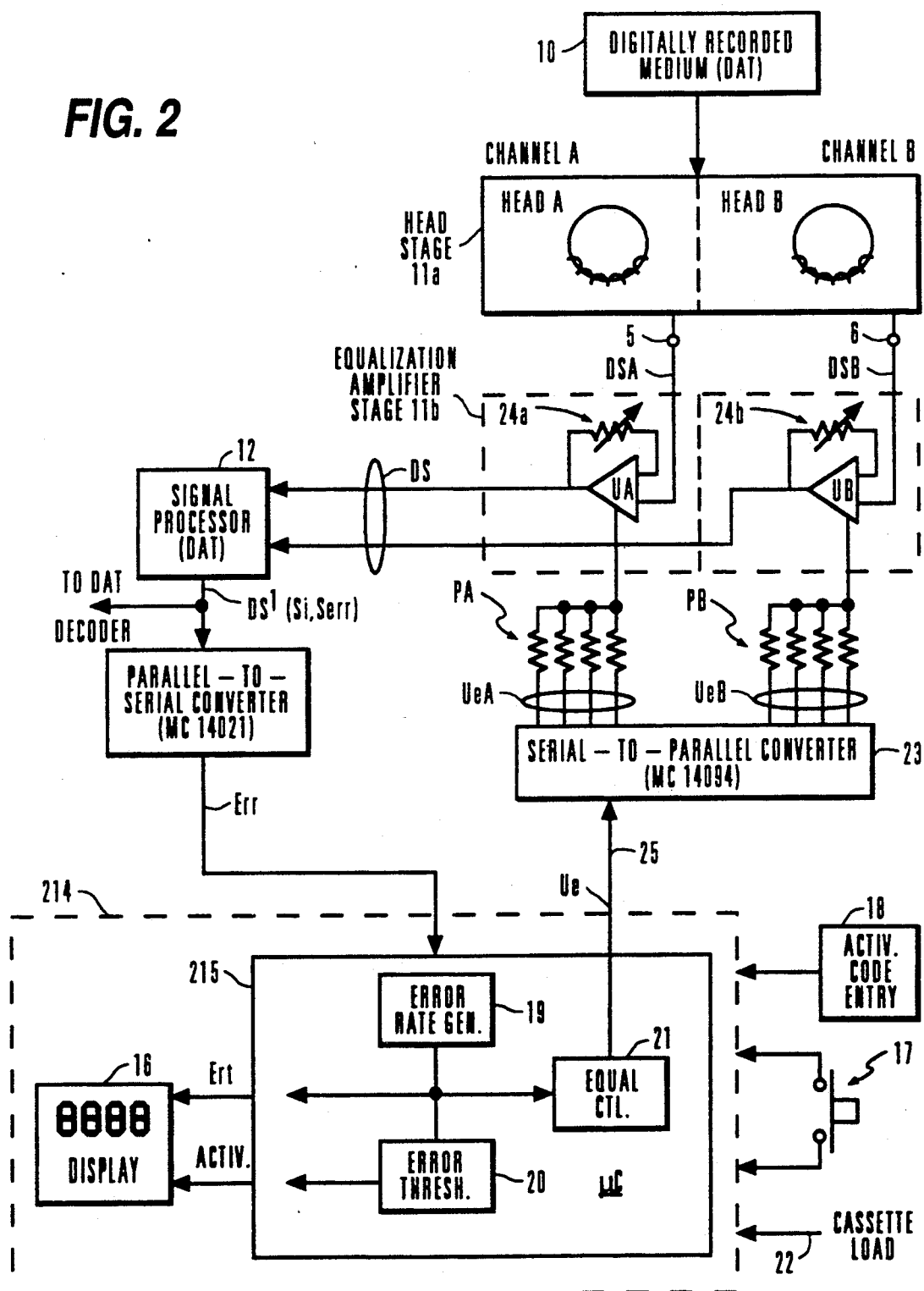
FIG. 2 illustrates in block circuit diagram a modification of the system of FIG. 1, where control of the head pre-amplifier equalization is provided responsive to the error rate.

FIG. 2 illustrates a modification of the block circuit diagram of FIG. 1, in accordance with a different aspect of the invention, where playback head equalization is controlled by the amount of recognized error in the digitally recorded record medium. Items in FIGS. 1 and 2 that serve similar functions or represent similar quantities are similarly identified.

In FIG. 2, a digitally recorded DAT tape is transduced by a conventional head transducer stage 11a. In the DAT system, helical scanning is performed by two rotating heads, head A and head B, associated with transmission channels A and B. Transduced digital signals DSA and DSB are developed at respective playback outputs 5 and 6.

Digital signals DSA and DSB are supplied to an equalization amplifier stage 11b that contains head preamplifiers UA and UB of respective transmission channels A and B. Amplifiers UA and UB perform, among other things, amplitude control of the outputs 5 and 6 of head transducer stage 11a. For this purpose, the gain of each amplifier may be individually adjusted by adjustable impedances in respective amplifier feedback circuits 24a and 24b.

The output of equalization amplifier stage 11b is the digital signal DS supplied to DAT signal processor 12. Signal processor 12 generates digital signal DS' for audio decoding and for generating the error recognition code Err, as described previously with respect to the block circuit diagram of FIG. 1.

Error recognition code signal Err is supplied to a microcomputer 215 of an error code and display processor 214. Similar to microcomputer 15 of FIG. 1, microcomputer 215 of FIG. 2 has an error rate generator block 19 that calculates the error rate and supplies it as an output to display 16 for visual display of the error rate.

In accordance with an aspect of the invention, the error rate information calculated by error rate generator 19 is supplied to an equalization control block 21 within microcomputer 215. The error rate data is weighted by equalization control block 21 to generate an equalization control signal Ue on a serial bit signal line 25. The information in control signal Ue is eight bits long with four bits containing the control information for controlling amplifier UA of transmission channel A, and with the other four bits containing the control information for controlling amplifier UB of transmission channel B. To convert the serial data on signal line 25 into two parallel four-bit equalization control signals UeA and UeB, a serial-to-parallel converter 23 is provided.

The four-bit control signals UeA and UeB directly control impedance networks PA and PB, respectively, which are coupled to negative feedback circuits 24a and 24b of amplifiers UA and UB. The various states of four-bit signals UeA and UeB effectively switch various ones of the four impedances in each of impedance networks PA and PB into and out of respective negative feedback circuits 24a and 24b. The switching of impedances PA and PB is controlled by microcomputer 215 in accordance with the error rate information processed by equalization control block 21. The impedance switching controls the amount of negative feedback provided by circuits 24a and 24b, and thus controls the gains of amplifiers UA and UB.

Microcomputer 215 individually adjusts the gain for transmission channels A and B to provide the best symmetry or playback equalization for the two channels at playback output terminals 5 and 6, and to provide minimum error rate in digital output signals DSA and DSB. Advantageously, the two functions of equalization and error rate minimization may be performed simultaneously and automatically.

The error rate minimization may be performed continually or aperiodically. The aperiodic operation of error rate control may be initiated by manual entry via code entry block 18, via pushbutton 17, or via signal line 22 during cassette loading, or may be automatically provided after a threshold error rate is reached in accordance with the calculations provided by threshold computation block 20.

What is claimed is:

1. Apparatus comprising:
   a plurality of transducer channels, each having a playback output, defining a source of a digital signal during playback from a recorded medium, said signal including a first component relating to information content in said signal and a second component providing error code information relating to errors introduced into said information content;
   at least one gain adjustable signal amplifier stage for adjusting at least one of said playback outputs to equalize playback between said plurality of transducer channels;
   a signal processor coupled to said source for deriving in accordance with said second component an error signal representative of said errors;
   means responsive to said error signal for generating an error rate signal representative of the rate of occurrence of said errors;

means for controlling said adjustable signal amplifier stage responsive to said error rate signal; and, means responsive to said error rate signal for displaying said error rate.

2. Apparatus according to claim 1 wherein said error rate signal generating means comprises a microcomputer.

3. Apparatus according to claim 1 further comprising a switch for activating said error rate displaying means.

4. Apparatus according to claim 1 including means for generating a signal activation code for activating said error rate displaying means.

5. Apparatus according to claim 1 wherein said error signal responsive means establishes a threshold value for said error rate for automatically activating said error rate displaying means upon exceeding said threshold value.

6. Apparatus according to claim 1 wherein said signal amplifier stage individually controls each of the plurality of channels.

7. Apparatus according to claim 1 wherein adjustment of equalization is performed continually during playback.

8. Apparatus according to claim 1 wherein adjustment of equalization is performed aperiodically.

9. Apparatus according to claim 1 wherein adjustment of equalization is performed in response to changeover from one to another one of said recorded medium.

10. Apparatus comprising:
a transducer stage having a plurality of transducing channels with respective playback outputs, for developing a digital signal during playback from a recorded medium, said signal including a first component relating to information content in said signal and a second component providing error code information relating to errors introduced into said information content;
at least one gain adjustable signal amplifier stage for adjusting playback equalization between said plurality of transducer channels;
a signal processor coupled to said transducer stage for deriving in accordance with said second component an error signal representative of said errors; and,
means for controlling said adjustable signal amplifier responsive to said error signal.

11. Apparatus according to claim 10 wherein said signal amplifier stage individually controls each of the plurality of channels.

12. Apparatus according to claim 10 wherein adjustment of equalization is performed continually during playback.

13. Apparatus according to claim 10 wherein adjustment of equalization is performed aperiodically.

14. Apparatus according to claim 13 wherein adjustment of equalization is performed in response to changeover from one to another one of said recorded medium.

15. Apparatus comprising:
a plurality of transducer channels, each having a playback output, defining a source of a digital signal during playback from a recorded medium, said signal including a first component relating to information content in said signal and a second component providing error code information relating to errors introduced into said information content;
at least one adjustable signal amplifier stage including a negative feedback circuit for adjusting playback equalization between said plurality of transducer channels;
a signal processor coupled to said source for deriving in accordance with said second component an error signal representative of said errors; and,
means for adjusting said negative feedback circuit responsive to said error signal.

16. Apparatus according to claim 15 wherein said feedback adjusting means includes an adjustable impedance responsive to said error signal.

17. Apparatus comprising:
a plurality of transducer channels having respective playback outputs and defining a source of a digital signal during playback from a recorded medium, said signal including a first component relating to information content in said signal and a second component providing error code information relating to errors introduced into said information content;
at least one adjustable signal amplifier stage including a negative feedback circuit;
a signal processor coupled to said source for deriving in accordance with said second component an error signal representative of said errors;
means responsive to said error signal for generating an error rate signal representative of the rate of occurrence of said errors;
means for controlling said negative feed back circuit responsive to said error rate signal for adjusting playback equalization between said plurality of transducer channels; and,
means responsive to said error rate signal for providing a visual display of said error rate.

18. Apparatus according to claim 17 wherein said feedback adjusting means includes an adjustable impedance responsive to said error signal.

* * * * *